Jan. 2, 1968     A. G. DEAN     3,361,087
SPRING APPARATUS FOR RAILWAY CARS
Filed Feb. 1, 1966     2 Sheets-Sheet 1
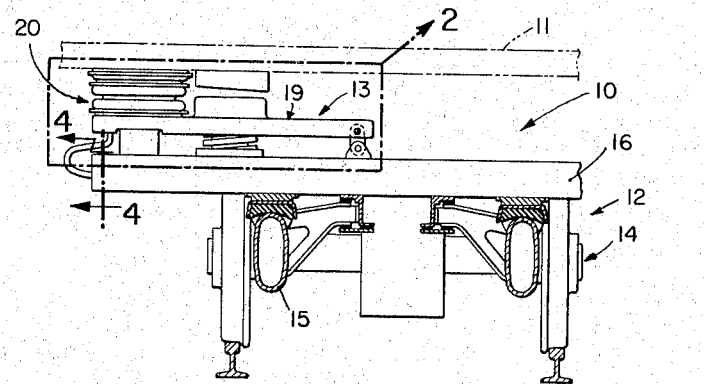
Fig. 1
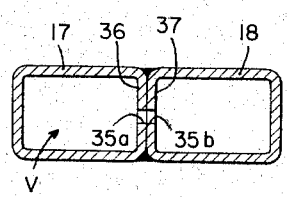
Fig. 4
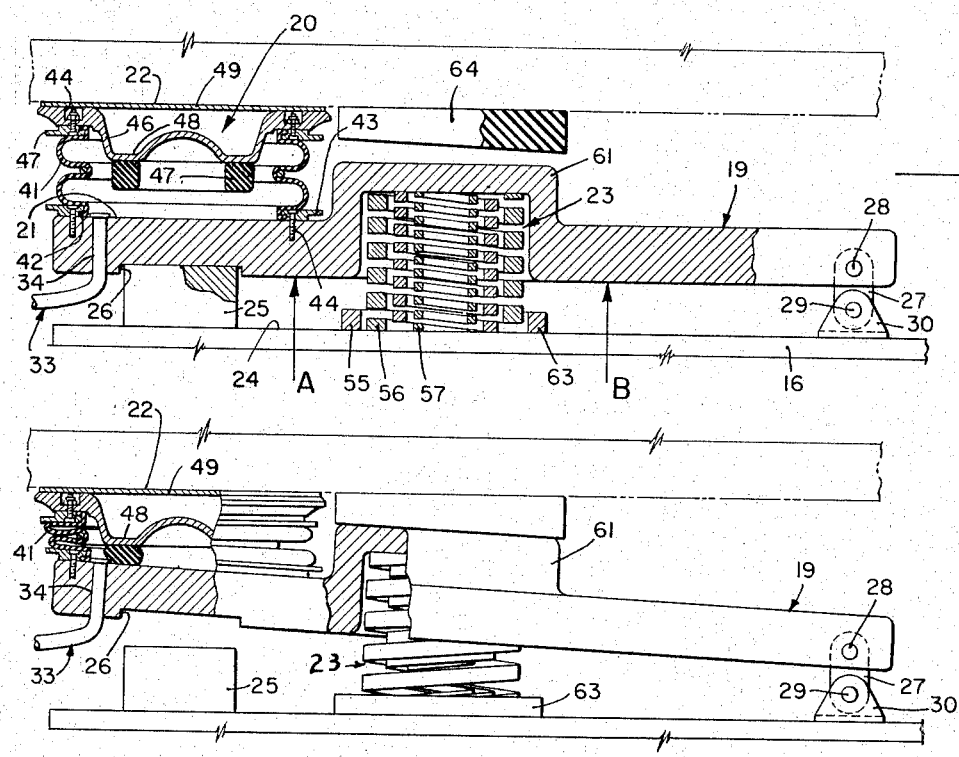
Fig. 2
Fig. 3
INVENTOR.
ALBERT G. DEAN
BY William R. Nolte
AGENT Jan. 2, 1968  A. G. DEAN  3,361,087
SPRING APPARATUS FOR RAILWAY CARS
Filed Feb. 1, 1966  2 Sheets-Sheet 2

INVENTOR.
ALBERT G. DEAN
BY William R. Nolte
AGENT

United States Patent Office 3,361,087
Patented Jan. 2, 1968

3,361,087
SPRING APPARATUS FOR RAILWAY CARS
Albert G. Dean, Narberth, Pa., assignor to The Budd Company, Philadelphia, Pa., a corporation of Pennsylvania
Filed Feb. 1, 1966, Ser. No. 524,068
9 Claims. (Cl. 105—453)

The present invention relates to a pneumatic spring apparatus for railway cars, and more particularly, to a pneumatic spring apparatus employing supplemental coil springs for use in railway cars.

Pneumatic spring systems heretofore employed in the prior art have included primary resilient air bellows devices sometimes cooperating with supplemental mechanical coil springs which together operate to maintain a car body at a predetermined level above a truck assembly. The air bellows in such systems are in communication with an air tank or reservoir adequately supplied with a suitable source of pressure, controlled as to demand and requirements. The supplemental mechanical steel coil springs have usually been placed in a side-by-side assisting relationship relative to the air bellows. When so arranged the air spring bellows and the mechanical springs deflect in unison and each operates to assume a predetermined share in supporting the vertical loads of the car. This has been disadvantageous, for aside from posing cost and space penalties, the use of the mechanical coil springs have precluded the full benefits of riding on air alone.

A further problem of such arrangements is related to the permissible excursion or change in level of the car body from its empty condition to its fully loaded condition. The limit of such excursion is usually fixed by Interstate Commerce Commission regulations and is in most instances limited to two inches of travel. Thus an empty car would stand two inches higher than a fully loaded car and the coupling apparatus usually employed would accept cars varying within such limits. With a car employing both air suspension and steel springs and in the event of a malfunction of its air bellows or air supply, the mechanical steel springs in such prior art designs would permit the car body to sag or drop below such limits, thereby precluding coupling of such a car by the aforementioned coupling apparatus. Accordingly, it is the principal object of this invention to provide supplemental spring apparatus controlled by the primary air spring suspension apparatus which avoids one or more of the disadvantages of the prior art, and which has improved efficiency.

It is another principal object of this invention to provide an improved primary air spring suspension apparatus for a railway car utilizing supplmental mechanical spring apparatus wherein in the event of a malfunction or collapse of the air suspension system the supplemental spring system will retain the proper level of the car body.

For a better understanding of the present invention, together with other and further objects thereof, reference is had to the following description taken in connection with the accompanying drawing and its scope will be pointed out in the appended claims.

In accordance with the invention pneumatic air spring means may be mounted between a truck assembly and a car body of a railway car in a manner to independently support the car body in either its empty or fully loaded condition at a proper level above the truck assembly.

The invention further contemplates the use of support beam means movably mounted between the body and the truck assembly, primary pneumatic spring means and secondary resilient body support means operatively associated with said beam support means, said car body, said truck assembly in one mode of operation so that primary pneumatic spring means acting through said beam support is normally effective to precompress said secondary spring means and upon dimunition or collapse of said primary and pneumatic spring means to release said secondary spring means to enable the same to solely support the car body at a proper level.

For a better understanding of the present invention together with other and further objects thereof, reference is had to the following description taken in conjunction with the accompanying drawings and its scope will be pointed out in the appended claims.

In the drawings, FIG. 1 is a partial vertical sectional view taken transversely of a railway car and showing a car body supported above a truck assembly by the spring apparatus of the present invention;

FIG. 2 shows the enclosed area designated 2 of FIG. 1, greatly enlarged;

FIG. 3 is a view similar to FIG. 2 showing the relationship of the spring apparatus of the present invention when the primary air spring means thereof is deflated;

FIG. 4 is a vertical sectional view taken along the line 4—4 of FIG. 1;

Figure 5:
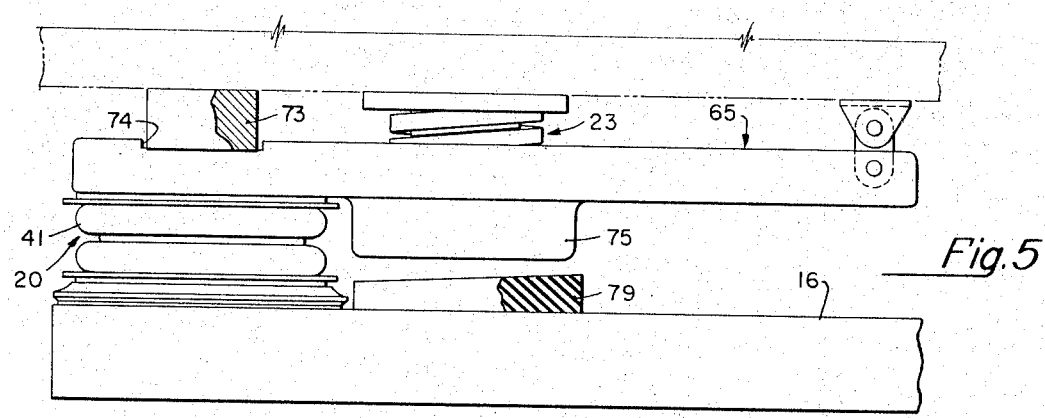
FIG. 5 is a modification of the arrangement of the spring apparatus shown in FIG. 1.

Referring to FIG. 1 of the drawings there is shown a railway car 10 having a body portion 11 and a truck assembly 12, the body being supported thereabove by the spring apparatus 13 of the present invention. The truck assembly may be of well known construction including a wheel-axle assembly 14, side frames 15 and a transverse truck bolster 16. As shown in FIG. 4 the truck bolster is formed of two rectangular tubes 17, 18 suitably welded together and in the present instances constitute a double reservoir V containing a supply of air or other medium under pressure. Such truck assembly may be of well known construction of the type shown and illustrated in U.S. Patent 2,908,230 to W. B. Dean entitled, "Railway Car Truck," dated Oct. 13, 1959 and assigned to the same assignee as the present invention.

In the preferred embodiment of the invention the spring apparatus 13 includes a support beam 19 which is mounted for movement between the car body 11 and the transverse bolster 16 of the truck assembly of the supporting wheel truck assembly. In the present instance a primary air spring suspension means 20 pneumatically controlled, is mounted adjacent the outer end and between its upper surface 21 of the beam and the undersurface 22 of the car body. Secondary resilient body support means 23 are also provided and are positioned inboard of said primary suspension means to engage the top surface 24 of the transverse bolster 16 and the undersurface of said beam.

When the air spring 20 is carrying the weight of the car as seen in FIG. 2, the beam comes down on a block 25 suitably secured to the top face of bolster 16 by engaging a notch 26 in the lower surface of beam 19. The vertical loads of the car body are transmitted through the beam and the block and then to the bolster of the truck assembly.

In order to provide movement for the beam, pivotal means in the form of a shackle 27, suitably secured to the inboard end of the beam by upper pin 28 and by lower pin 29 affixed to clevis 30, which in turn is secured to the top of bolster 16. The shackle constitutes a swing link for limited transverse movement of the beam when the car body is supported by the supplemental coil spring means in a manner to be later described. As seen in FIG. 2 the primary pneumatic spring suspension means 20 besides carrying the vertical loads of the car body produces a lever action of beam 19 sufficient to compress supplemental spring 23 and thereby effectively provides an air cushion for the body to ride upon. The air suspension means 20 are connected by means of a flexible hose 33 which at its lower end communicates with the aforementioned double reservoir V in the truck bolster 16. The upper end of the flexible hose passes through an aperture 34 of the beam 19 and opens with the interior of the air spring means. As seen in FIG. 4 the rectangular cross-sectional members 17, 18 of the bolster include aligned openings 35a, 35b in their respective inner walls 36 and 37.

With reference now to FIG. 2 the latter air suspension means includes a resilient cylindrical bellows member 41 having an enlarged bead-like lower edge 42, which is clamped to the upper surface 21 of beam 19 by means of clamping ring 43, and is secured in place as by bolts 44. The upper edge 45 of the bellows member 41 is likewise enlarged and is clamped to an annularly dished plate 46 by means of upper clamping ring 47 and bolts 44. The plate 46 includes a resilient bumper member 47 at the base of the annular depressed ring portion 48 of dished member 46 which serves to limit the upper movement of the beam 19 in a manner to be hereinafter described. The top peripheral margins of plate 46 engage a plate 49 suitably affixed to the underframe of the car body 11.

During normal operations of the car and commensurate with the passenger loads carried thereby, a suitable supply of air under pressure is directed from the reservoir V by flexible hose 33 to the interior of the bellows 41 to maintain the beam 19 in a normal horizontal position as shown in FIG. 2. When subjected to such a condition of loading, the secondary spring means 23 comprising one or more cylindrically arranged coil spring elements 55, 56 and 57 are compressed to assume the attitude as shown in FIG. 2. To facilitate the retention of the secondary springs 23 in such attitude, the beam 19 is provided with a cup-shaped formation as at 61 to engage the upper ends of the forementioned spring members. An enlarged ring-like member 63 having an interior diameter slightly in excess of the outer diameter of larger spring member 55 is suitably affixed to the top surface of the bolster 16 in concentric arrangement with the springs to thereby prevent lateral shifting of the lower portions of the springs.

As previously mentioned, the coil spring means 23 may be of sufficient weight supporting capability as to support the car body at a desired level above the bolster 16 upon failure of the primary air spring 20. This necessitates the precompression of the secondary spring means 23 during normal inflated operation of primary spring means 20. Upon loss of air in either the reservoir V, or upon failure of the primary suspension means, the beam 19 is enabled to rotate in a clockwise direction about pivot 28 as seen in FIG. 3. This upward movement is first limited by a resilient bumper member 64 which is affixed to the undersurface of the car body 11 and in line with the axis of the spring means 23. The action is further limited by the resilient bumper member 47 affixed to the lower surface of dished member 46 within bellows 41, upon collapse of the latter. The resilient members 64 and 47 are thereby contracted a slight amount with such collapse of the bellows member 41. In this condition the weight of car body is transmitted through the latter dished member through resilient member 47 and thence to the beam, which is in turn supported in an upwardly included attitude by the supplemental or secondary spring means 23. In this connection it is observed that the supplemental spring means 23 supports the car body 11 at approximately the same level as that at which the primary air spring means 20 supported it prior to collapse of the last named spring means. Transverse movement of the car body and beam above is resisted by the coil spring means 23 and limited by swingable shackle link 27.

From the aforedescribed action it follows therefore that the spring means 23 acting independently of primary spring means 20 is capable alone of supporting the car body at the desired proper level. It is observed however that when the primary air spring 20 is functioning, its internal pressure combined with the weight of the car, cooperates with the beam 19 to rotate the same in a counter-clockwise manner about pivot shaft 28. The beam thus multiplies the effort or force applied by the car body through the air bellows 20 to precompress the coil spring means 27. It is apparent also that for a given stiffness constant K for spring means 23 that the beam 19 would exert a lesser leverage if the spring means were to be moved to a location corresponding to the arrow A, and a greater amount if the spring were to be moved rightwardly to the location corresponding to the arrow B. Thus for a given passenger loading a supplemental spring of desired stiffness constant K, and damping characteristics, may be employed and suitably positioned along the length of the beam 19 to retain the proper level of the car body in the event of a malfunction of the primary air spring means 20.

Figure 6:
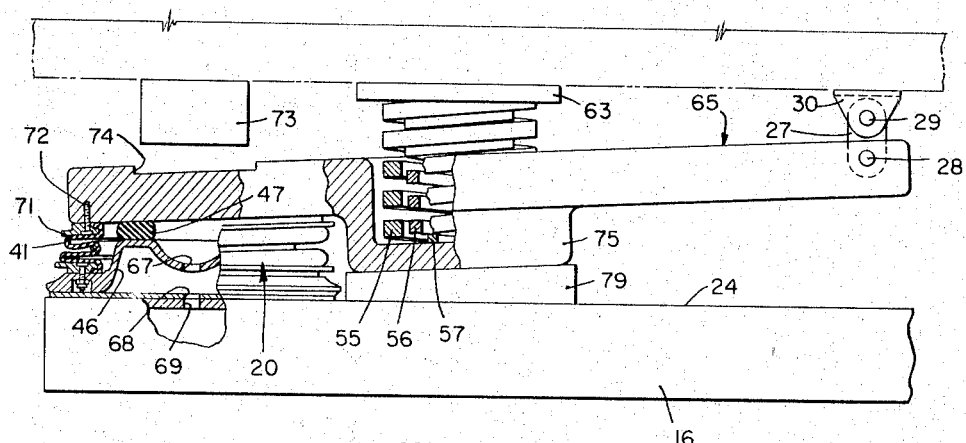
FIG. 6 is a partial sectional view of the spring apparatus of FIG. 5 in which the pneumatic suspension means thereof is deflated.

A modification of the suspension apparatus and embodying this invention is shown in FIGS. 5 and 6. The apparatus may readily be employed by transposing the relationship of the primary and secondary spring means 20, 23 respectively relative to the movable beam 65 which is posed between the car body 11 above and the truck bolster 16 therebeneath. As in the preferred embodiment, the beam 65 is subjected to severe bending loads and must therefore be of suitable construction such as heavy casting and is mounted for pivotal movement at its inboard end as by the aforedescribed shackle 27 and clevis 30 affixed in the present instance to the undersurface of the framing of car body 11. The aforementioned primary air spring 20 is interposed between the outboard free end of the beam and the bolster 16 of the truck assembly.

As seen in FIG. 6 the annular dished plate member 46 and plate 49 are positioned on the top surface 24 of the bolster 16 and are provided with aligned apertures 67, 68 and 69 respectively which communicate with the air reservoir V to admit a supply of air within the bellows 41 to inflate the same as shown in FIG. 5. The upper portion of the bellows member is suitably secured to the undersurface of the beam 65 as by retaining ring 71 and bolts 72. A stop member 73 is suitably affixed to the undersurface of the car body 11 and in line with the axis of the spring means 23. It engages notch 74 and functions to assist in limiting the upward movement of the beam 65 to its horizontal attitude as shown in FIG. 5. In this manner the weight of the car body is transmitted to beam 65 and thence to the air spring 20 with the entrapped air therein so that during normal operations the car is supported solely by the air springs 20. In this position of beam 65 the stop 73 engaging notch 74 locks the beam against transverse movement so that the air spring resists the lateral thrusts of the car body.

Supplemental coil spring means 23 are provided inboard of the primary spring means 20 and interposed between the lower surface of the car body and the upper surface of the beam 65. The beam 65 may include a suitable cuplike deformation as at 75 to retain the plurality of springs 55, 56, 57 in their nested relationship at the lower ends, while the ring 63 concentrically arranged and affixed to the lower surface of the car body. Upon failure of the primary supporting air spring 20 due to loss of air, or during yard operations of the rail car, the secondary supplemental spring means 23 is released and permitted to expand so that it becomes the sole body support. In this condition the outboard end of the beam 65 is rotated in a clockwise direction upon gradual loss of air in the bellows 41 until the undersurface of cup portion 75 of the beam strikes a resilient bumper stop 79. Thereafter further counterclockwise rotational movement of the beam is resisted by annular dished plate member 46 and bumper 47, and correspondingly the supplemental spring means expand to support the car body above the bolster 16 without a drop off in its elevation. The swingable shackle link and coil springs 55, 56, 57 resist and limit lateral thrusts of the car body in this state.

Although the above described embodiments disclose the invention as applied to a railway passenger car, it is to be understood that the invention may be applied to other car body applications such as highway trucks and the like.

While there have been described what are at present considered to be the preferred embodiments of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. In a suspension system for a vehicle including a vehicle body and a supporting wheel truck assembly, a support beam mounted for movement between said body and said truck, primary and secondary resilient body support means operatively associated with said beam, said body, and said truck assembly, said primary support means through said support beam being normally effective to inactivate said secondary support means, said primary support means upon collapse thereof being effective through said support beam to activate said secondary support means, said secondary support means, when so activated, being capable of supporting said vehicle body to prevent substantial downward displacement thereof and to thereby constitute the sole support means of aforesaid vehicle body.

2. In the suspension system for a vehicle as set forth in claim 1 wherein said primary resilient body support means includes a pneumatic cylinder disposed between one end of said beam and beneath said car body.

3. In the suspension system for a vehicle as set forth in claim 2 wherein said secondary resilient support means includes at least one coil spring supported between said truck assembly and said support beam.

4. In the suspension system for a vehicle as set forth in claim 3 and including pivotally mounting means connecting the other end of said support beam to said truck assembly whereby the vertical loads of said car body are transmitted through said primary resilient support means and are effective to rotate said beam support in a manner to normally inactivate said secondary resilient support means.

5. In the suspension system for a vehicle as set forth in claim 4 including stop means affixed to said truck assembly and disposed adjacent and beneath said one end of said beam support, said stop means being effective in one position of movement of said beam support to limit its rotation about said pivot means and to transmit the vertical loads of said body to said truck assembly means.

6. In the suspension system for a vehicle as set forth in claim 5 wherein said beam support means includes a cutout portion adapted to coact with said stop means to thereby limit the lateral transverse movement of said beam support in said one position of movement thereof.

7. In the suspension system for a vehicle as set forth in claim 1 wherein said primary resilient body support means includes a pneumatic cylinder disposed between one end of said beam and the truck assembly thereunderneath.

8. In the suspension system for a vehicle as set forth in claim 7 wherein said secondary resilient support means includes at least one coil spring supported at its lower end on the top surface of said support beam and having its upper end thereof coacting with the undersurface of the car body.

9. In the suspension system for a vehicle as set forth in claim 8 including pivotal mounting means connecting the other end of said support beam to said vehicle body and including stop means affixed to the undersurface of said vehicle body, said primary resilient support means being normally effective to rotate said beam to inactivate said secondary resilient support means, and into abutting engagement with said stop means.

References Cited

UNITED STATES PATENTS 3,212,460  10/1965  Peras _____ 105—453

JOSEPH R. LECLAIR, *Primary Examiner.*

ARTHUR L. LA POINT, *Examiner.*

R. M. WOHLFARTH, *Assistant Examiner.*